United States Patent Office 3,544,326
Patented Dec. 1, 1970

3,544,326
LIGHT-SENSITIVE COLOR PHOTOGRAPHIC ELEMENTS
Makoto Yoshida, Akio Okumura, and Shinichi Imai, Kanagawa, Japan, assignors to Fuji Photo Film Co., Ltd., Kanagawa, Japan
No Drawing. Filed July 29, 1968, Ser. No. 748,182
Claims priority, application Japan, July 29, 1967, 42/48,759
Int. Cl. G03c 1/10
U.S. Cl. 96—99
2 Claims

ABSTRACT OF THE DISCLOSURE

A light sensitive color photographic element intended for silver dye bleaching wherein the silver halide emulsion contains a magenta dye having the formula

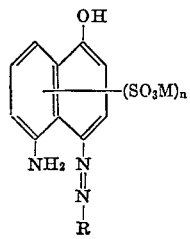

wherein R is an unsubstituted aryl or a substituted aryl group, M is hydrogen, alkali metal or ammonium and $n$ is 0 or 1.

BACKGROUND OF THE INVENTION

Field of the invention

The present invention relates generally to color photography and more particularly to a light-sensitive color photographic element having a silver halide emulsion layer containing a magneta dye to be processed by a silver dye bleaching method.

Description of the prior art

A magenta dye used in light-sensitive color photographic elements by a silver dye bleaching method is usually an azo dye. The azo dye is bleached in proportion to the silver image formed after developing to provide a positive magenta image. Therefore, in order to use the azo dye for this purpose, the dye must be easily reduced in proportion to the amount of silver present and must be capable of being completely bleached. The dye must also have an absorption spectra which is preferably close to that of magenta dye. Furthermore, the dye must not be easily diffused into the other emulsion layers when incorporated into the silver halide emulsion layer, and the dye should not cause fog formation or desensitization of the photographic emulsion. Moreover, the dye should be stable to chemical processing such as developing and fixing and should have a high light-fastness.

There are many descriptions in the prior art of dyes which satisfy the aforesaid factors, but they are almost always bisazo and trisazo dyes having a naphthol nucleus and a complicated chemical structure. Mono-azo dyes are also described in the literature, but they usually have more than two anionic groups, such as sulfo groups, and hence their chemical structures are also considerably complicated.

Thus, an object of this invention is to provide a light-sensitive color photographic element having a silver halide emulsion layer for silver dye bleaching methods whereby an excellent magenta dye is used which satisfies each of the aforesaid factors, but which is characterized by a simple chemical structure which can be easily and economically prepared.

SUMMARY OF THE INVENTION

The aforesaid objects can be attained by incorporating in a silver halide photographic emulsion layer of a light-sensitive color photographic element, intended for silver dye bleaching methods, a magenta dye represented by the formula,

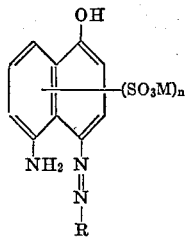

wherein R represents a substituted or unsubstituted aryl group, M represents a hydrogen atom, an alkali metal atom or ammonium, and $n$ is 0 or 1.

DETAILED DESCRIPTION OF PREFERRED EMBODIMENTS

The magenta azo dye used in this invention is characterized by excellent absorption characteristics and is easily bleached. When it is incorporated in a photographic silver halide emulsion, it will have less adverse effects on the photographic properties of the emulsion.

Moreover, since the azo dye of the present invention is simple in chemical structure, it may be easily prepared, and since the raw material comprises mainly 5-amino-1-naphthol, a low cost commercially available material, the azo dye can be most economically prepared. Furthermore, the simple preparation of the azo dye reduces the probability of contaminants forming in the azo dye and hence the azo dye can be prepared at a high purity. Thus, the azo dye of this invention is quite desirable as a dye for light-sensitive color photographic elements intended for silver dye bleaching methods, especially in view of the fact that impurities which often yield adverse effects can be kept at a minimum.

It is a particularly surprising feature of this invention that, in spite of the dye's simple chemical structure, the azo dye substantially satisfies the various factors necessary for the dyes used in a light-sensitive color photographic element intended for silver dye bleaching methods. While it is not certain, it is believed that the surprising results can be attributed to the presence of the amino group at the 5-position of the naphthol nucleus.

In general, those dyes of the present invention having at least one sulfo group at the 5-amino-1-naphthol nucleus or at the arylazo portion are especially useful for aqueous solutions of photographic emulsions. On the other hand, those dyes of the present invention without a sulfo group are especially useful for organic solvent solutions of photographic emulsions. When the azo dye of this invention is incorporated into a photographic emulsion as a solution in an organic solvent, the dye has been found to be substantially resistant to diffusion into other layers, although the dye has a comparatively simple chemical structure and its molecular weight is comparatively low.

A wide variety of organic solvents can be used for the magenta azo dye used in this invention. Exemplary of these are the alcohols such as methanol, ethanol, ethylene glycol and the like; esters, such as ethyl acetate, butyl acetate, dibutyl phthalate, dioctyl phthalate and the like; ketones, such as acetone, methyl ethyl ketone and the like; ethers, such as dioxane, tetrahydrofuran and the like; phosphoric acid esters, such as triphenyl phosphate, tricresyl phosphate and the like, and alkylamides, such as dibutyl laurylamide and the like.

Among the azo dyes used in this invention, the dye having a sulfo group at the 5-amino-1-naphthol nucleus may be easily prepared by using, commercially available M-acids (i.e., 1-amino-4-naphthol-6-sulfonic acid).

The magenta azo dye used in this invention may be employed in light-sensitive mono-color or di-color photographic elements where silver dye bleaching methods are intended. They may also be used in light-sensitive natural color photographic elements which are intended for silver dye bleaching methods.

A wide variety of magenta dyes may be used in the present invention. Exemplary of these can be represented by the following formulas. This invention is not intended to be limited to these specific dyes.

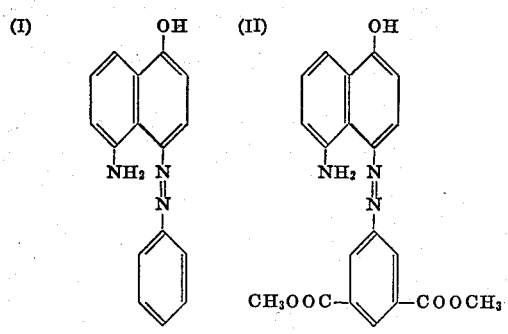

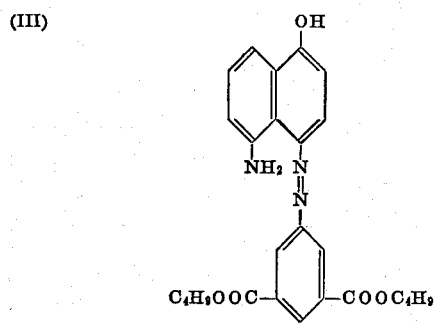

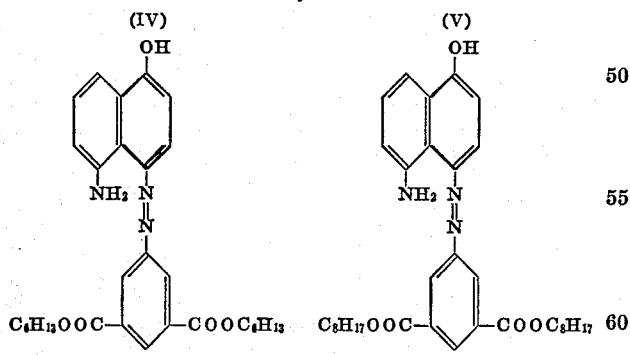

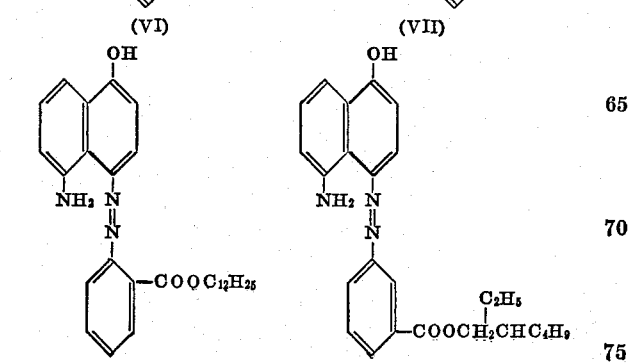

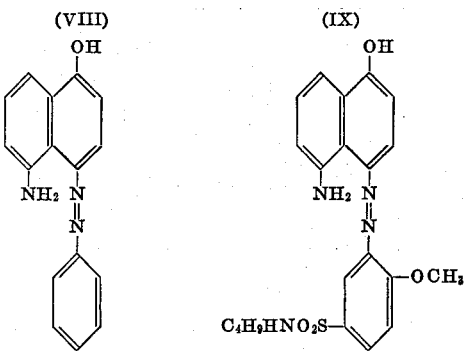

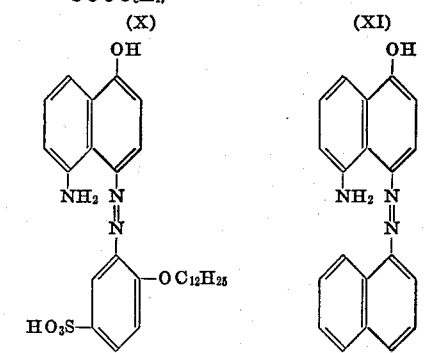

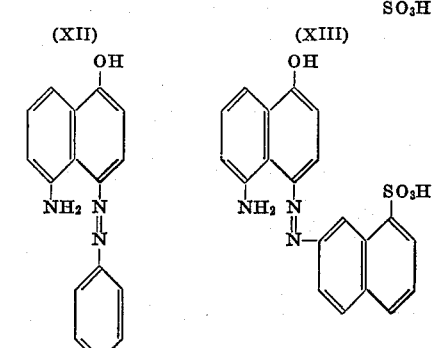

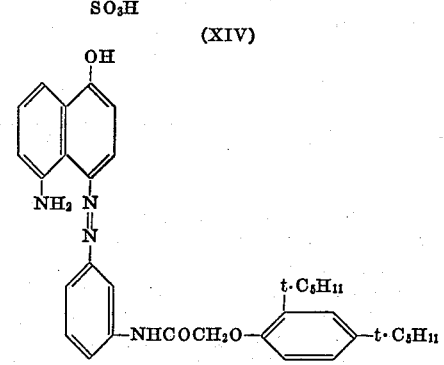

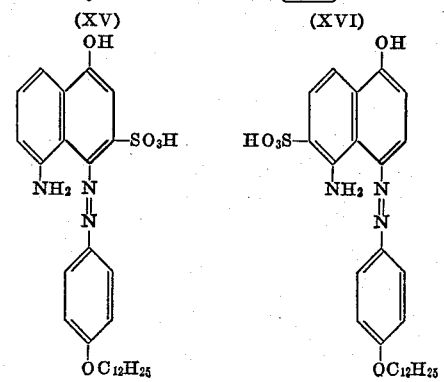

(XVII)

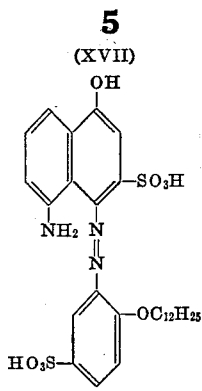

The magenta azo dyes of this invention may be easily prepared by diazotizing the aromatic amine in the azo portion and thereafter by diazo-coupling the product with 5-amino-1-naphthol in a basic solvent.

The typical examples of the preparation of the magenta azo dyes of this invention are shown below.

Preparation 1

Preparation of 4-(3',5'-dibutyloxycarbonylphenylazo)-5-amino-1-naphthol (Formula III):

6.3 g. of 3,5-dibutyloxycarbonylaniline was dissolved in 50 ml. of ethanol. After adding 5 ml. of concentrated hydrochloric acid and 10 ml. of water, the system was diazotized with 1.7 g. of sodium nitrite at 0° C. to provide a solution of a diazonium salt. The solution prepared was added dropwise to a solution of 5 g. of 5-amino-1-naphthol in 50 ml. of pyridine with stirring to cause coupling. The crystals thus formed were recrystallized from ethyl acetate to provide the objective dye having a melting point of 200° C. with a yield of 55%.

Preparation 2

Preparation of 4-(2'-methoxy-5'-N-n-butylaminosulfonyl-phenylazo)-5-amino-1-napthol (Formula IX):

6.5 g. of 2-methoxy-5-N-n-butylaminosulfonyl aniline was dissolved in 50 ml. of ethanol and after adding 10 ml. of water and 5 ml. of concentrated hydrochloric acid, the system was diazotized with 1.7 g. of sodium nitrite at 0° C. to provide a solution of a diazonium salt. The solution was added dropwise to a solution of 5 g. of 5-amino-1-naphthol in 50 ml. of pyridine, with stirring, to cause coupling. The crystals thus formed were recrystallized from ethyl acetate to provide the objective dye having a melting point of 195° C. with a yield of 62%.

Preparation 3

Preparation of 4-(4'-sulfophenylazo)-5-amino-1-naphthol (Formula XII):

Sulfanilic acid (8.7 g.) was diazotized at 0° C. with hydrochloric acid and sodium nitrite in a conventional manner and the solution prepared was added dropwise to a solution of 10 g. of 5-amino-1-naphthol in 100 ml. of pyridine, with stirring, to cause coupling. After the reaction was finished, the reaction mixture was acidified with hydrochloric acid and the crystals thus formed were recovered by filtration. The crystals were sufficiently washed with ethanol to provide the objective dye having a melting point of higher than 250° C. with a yield of 51%.

Preparation 4

Preparation of 4-(4'-sulfonaphthylazo) - 5 - amino-1-naphthol (Formula XI):

The procedure as in Preparation 3 was repeated using 4-sulfo-1-naphthylamine instead of sulfanilic acid to provide the objective dye having a melting point of higher than 250° C. with a yield of 76%.

The examples of the present invention are as follows.

EXAMPLE 1

0.2 g. of the magenta dye shown by Formula II was dissolved in 2 ml. of tricresyl phosphate and the solution thus prepared was dispersed in 10 ml. of a 10% aqueous gelatin solution containing 2 ml. of a 10% aqueous solution of sodium alkylbenzene sulfonate by means of a homogenizer-blender. A mixture of 6 g. of the dispersion prepared and 20 g. of a silver bromide photographic emulsion (containing about 30 g. of silver bromide per 1 kg. of emulsion) was applied to a glass plate followed by drying.

The light-sensitive plate was exposed through an optical wedge and thereafter developed for ten minutes in a developer having the following composition:

| | Grams |
|---|---|
| N-methyl-p-aminophenol 1/2.sulfate | 2.0 |
| Sodium sulfite (anhydrous) | 30.0 |
| Sodium carbonate | 20.0 |
| Hydroquinone | 8.0 |
| Potassium bromide | 4.0 |
| Water to make 1 liter. | |

Thereafter, the plate was washed with water and fixed for four minutes in a fixing solution having the following composition:

| | Grams |
|---|---|
| Sodium thiosulfate (anhydrous) | 350 |
| Sodium sulfite (anhydrous) | 10 |
| Water to make 1 liter. | |

After fixing, the plate was washed with water, hardened in a 4% aqueous solution of formaldehyde, washed with water, and processed for 15 minutes in a dye bleaching solution having the following composition:

Thiourea—60 g.
Potassium bromide—30 g.
Concentrated hydrochloric acid—30 ml.
2-amino-3-hydroxyphenazine—0.01 g.
Water to make 1 liter.

The light-sensitive plate was washed with water and silver-bleached in a solution having the following composition:

Crystalline copper sulfate—100 g.
Concentrated hydrochloric acid—100 ml.
Water to make 1 liter.

The photographic plate was then fixed in a fixing bath having the aforesaid composition, washed with water again, and dried.

By the above processings, a magenta image in which the high light portion had been completely bleached was obtained. The image thus formed was particularly suitable as a magenta image component in multi-color light-sensitive elements for silver dye bleaching methods.

EXAMPLE 2

Instead of 2 ml. of tricresyl phosphate as in Example 1, 0.2 g. of the magenta dye represented by the Formula IX was dissolved in a mixed solvent of 2 ml. of dibutyl phthalate and 1 ml. of butyl acetate, and the procedure as in Example 1 was repeated to provide a good magenta wedge image.

EXAMPLE 3

1 g. of the magenta dye represented by the Formula XII was dissolved in 100 ml. of a 5% aqueous sodium hydroxide solution and a mixture of 80 ml. of the dye solution and 100 g. of a silver bromide emulsion (containing about 30 g. of silver bromide per 1 kg. of emulsion) was applied to a glass plate. The magenta dye was fixed in the emulsion layer by means of a precipitant (diphenyl guanidine). The light-sensitive emulsion layer was exposed through an optical wedge and processed as in Example 1 to provide a magenta wedge image. The image thus formed was quite suitable as a magenta image component in multi-color light-sensitive elements for silver dye bleaching methods.

What is claimed is:

1. A light-sensitive color photographic element intended for silver dye bleaching methods which comprises a support having thereon a silver halide emulsion layer containing a magenta dye represented by the general formula

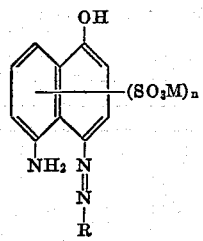

wherein R is a member selected from the group consisting of an unsubstituted aryl group and a substituted aryl group; M is a member selected from the group consisting of a hydrogen atom, an alkali metal atom, and ammonium; and $n$ is 0 or 1.

2. The light-sensitive color photographic element as claimed in claim 1, wherein said magenta dye is a member selected from the group consisting of

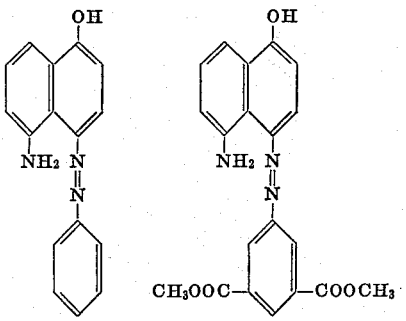

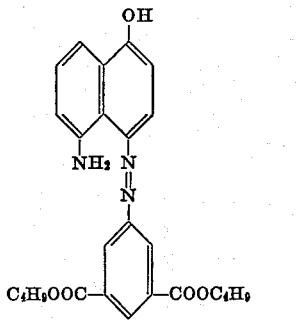

References Cited

UNITED STATES PATENTS 2,342,620  2/1949  Woodward _____ 69—99

NORMAN G. TORCHIN, Primary Examiner

A. T. SURO PICÓ, Assistant Examiner

U.S. Cl. X.R.

260—198